(12) United States Patent
Brice

(10) Patent No.: US 10,337,453 B2
(45) Date of Patent: Jul. 2, 2019

(54) ATTACHMENT FEATURE FOR A CORE PANEL

(71) Applicant: ROHR, INC., Chula Vista, AZ (US)

(72) Inventor: David C. Brice, Bonita, CA (US)

(73) Assignee: ROHR, INC., Chula Vista, CA (US)

( * ) Notice: Subject to any disclaimer, the term of this patent is extended or adjusted under 35 U.S.C. 154(b) by 631 days.

(21) Appl. No.: 14/692,158

(22) Filed: Apr. 21, 2015

(65) Prior Publication Data

US 2016/0312657 A1 Oct. 27, 2016

(51) Int. Cl.
*F02K 1/04* (2006.01)
*F01D 25/30* (2006.01)

(52) U.S. Cl.
CPC .............. *F02K 1/04* (2013.01); *F01D 25/30* (2013.01); *F05D 2230/232* (2013.01); *F05D 2230/60* (2013.01); *F05D 2250/283* (2013.01)

(58) Field of Classification Search
CPC ........................................................ F02K 1/04
See application file for complete search history.

(56) References Cited

U.S. PATENT DOCUMENTS

| | | | | |
|---|---|---|---|---|
| 6,123,170 A | * | 9/2000 | Porte | B64D 33/02 181/198 |
| 7,926,285 B2 | * | 4/2011 | Tisdale | F02K 1/386 239/265.39 |
| 2011/0203255 A1 | * | 8/2011 | Conete | F02K 1/04 60/226.1 |
| 2014/0158458 A1 | * | 6/2014 | Malot | F02K 1/04 181/222 |

* cited by examiner

*Primary Examiner* — Kayla Mccaffrey
(74) *Attorney, Agent, or Firm* — Snell & Wilmer, L.L.P.

(57) ABSTRACT

An attachment feature for a structural panel may include a bracket arm with one or more flanges extending from the bracket arm. Each flange may have a lead ramp and a land. The structural panel may include a core sandwiched between two skins. The two skins may have portions which are cantilevered from the core. The lead ramps may guide the skins to the lands to align the structural panel with the attachment feature.

13 Claims, 5 Drawing Sheets

ATTACHMENT FEATURE FOR A CORE PANEL

FIELD

The present disclosure relates to aircraft nacelles, and more particularly to attachment features for core panes in aircraft nacelles.

BACKGROUND

Aircraft nacelles typically include structural panels. Various portions of the nacelle may comprise a structural panel, such as in the exhaust nozzle and in the nozzle center body. The structural panels include a core positioned between a top sheet and a back skin. The core includes a plurality of cells. The structural panels provide a strong and lightweight component which may be formed in various shapes, including in an annular ring, or barrel.

The structural panels may be coupled to adjacent panels with an attachment feature. The top skin and the back skin may be butt welded to the attachment feature. However, it may be difficult to align both the top skin and the back skin with the attachment feature. One side of the structural panel may be shimmed to align with the attachment feature. However, manufacturing tolerances in the structural panel and the attachment feature may result in the other side of the structural panel being misaligned with the attachment feature.

SUMMARY

An attachment feature for a structural panel may comprise a bracket arm and a first flange extending from the bracket arm, wherein the first flange comprises a first land and a first lead ramp adjacent to the land.

In various embodiments, the attachment feature may be an annular ring. The attachment feature may comprise a second flange extending from the bracket arm. The second flange may comprise a second land and a second lead ramp adjacent to the second land. The first land may be parallel to a top surface of the bracket arm. The first land and the first lead ramp may form an angle of between 10°-20°. The first flange may be located on a first side of the bracket arm, and a second flange may be located on a second side of the bracket arm.

A nacelle may comprise a structural panel comprising a top skin, a back skin, and a core located between the top skin and the back skin; and an attachment feature coupled to the structural panel, wherein the attachment feature comprises a lead ramp and a land.

In various embodiments, the top skin comprises a cantilevered portion coupled to the land. The cantilevered portion may be at least one of welded or bonded to the land. The cantilevered portion may be bent relative to the top skin. The structural panel may be a portion of an exhaust nozzle center body. The attachment feature may be a center body attach ring. The top skin may be flush with a top surface of the attachment feature. The land and the lead ramp may form an angle of between 10°-20°.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

A structural panel for a nacelle may comprise a top skin, a back skin, and a core coupled between the top skin and the back skin. The core may comprise a plurality of honeycomb cells. The structural panel may attach to an attachment feature. The attachment feature may comprise a first land and a second land. The attachment feature may comprise a first lead ramp formed at an angle with the first land, and a second lead ramp formed at an angle with the second land.

The top skin and the back skin may extend beyond the edge of the core. The top skin may be roughly aligned with the first lead ramp, and the back skin may be roughly aligned with the second lead ramp. The structural panel may be joined to the attachment feature by pressing the structural panel and the attachment feature together. The top skin may contact the first lead ramp, and the back skin may contact the second lead ramp. As the structural panel and the attachment feature are pressed together, the first lead ramp may guide the top skin to the first land, and the second lead ramp may guide the back skin to the second land. The top skin and the back skin may slightly bend to accommodate small mismatches in tolerance between the thickness of the structural panel and the attachment feature. Similarly, in cases where the attachment feature forms an annular ring or other curved shape, the lead ramps may allow for mismatches in tolerance between the shape of the attachment feature and the structural panel. The top skin and the back skin may be welded or bonded to the first land and the second land, respectively.

Figure 1:
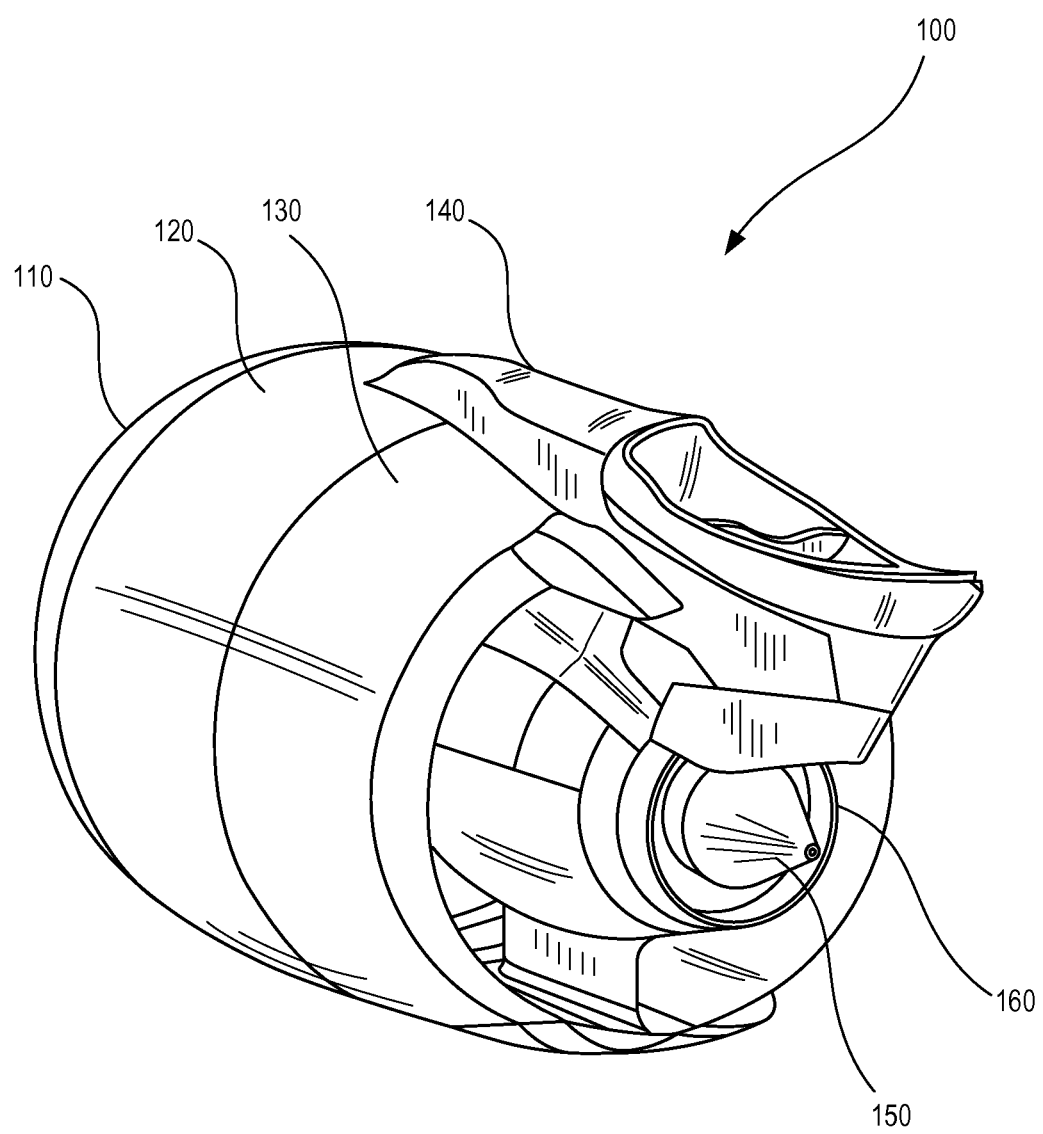
FIG. 1 illustrates a perspective view of a nacelle for an aircraft in accordance with various embodiments.

Referring to FIG. 1, a nacelle 100 for a gas turbine engine is illustrated according to various embodiments. Nacelle 100 may comprise an inlet 110, a fan cowl 120, and a thrust reverser 130. Nacelle 100 may be coupled to a pylon 140, which may mount the nacelle 100 to an aircraft wing or aircraft body. Nacelle 100 may further comprise an exhaust nozzle center body 150. Hot gas from a gas turbine engine may exit the gas turbine engine through the exhaust nozzle 160 around the exhaust nozzle center body 150. The exhaust nozzle center body 150 may be coupled to the gas turbine engine via a center body attachment ring.

Figure 2:
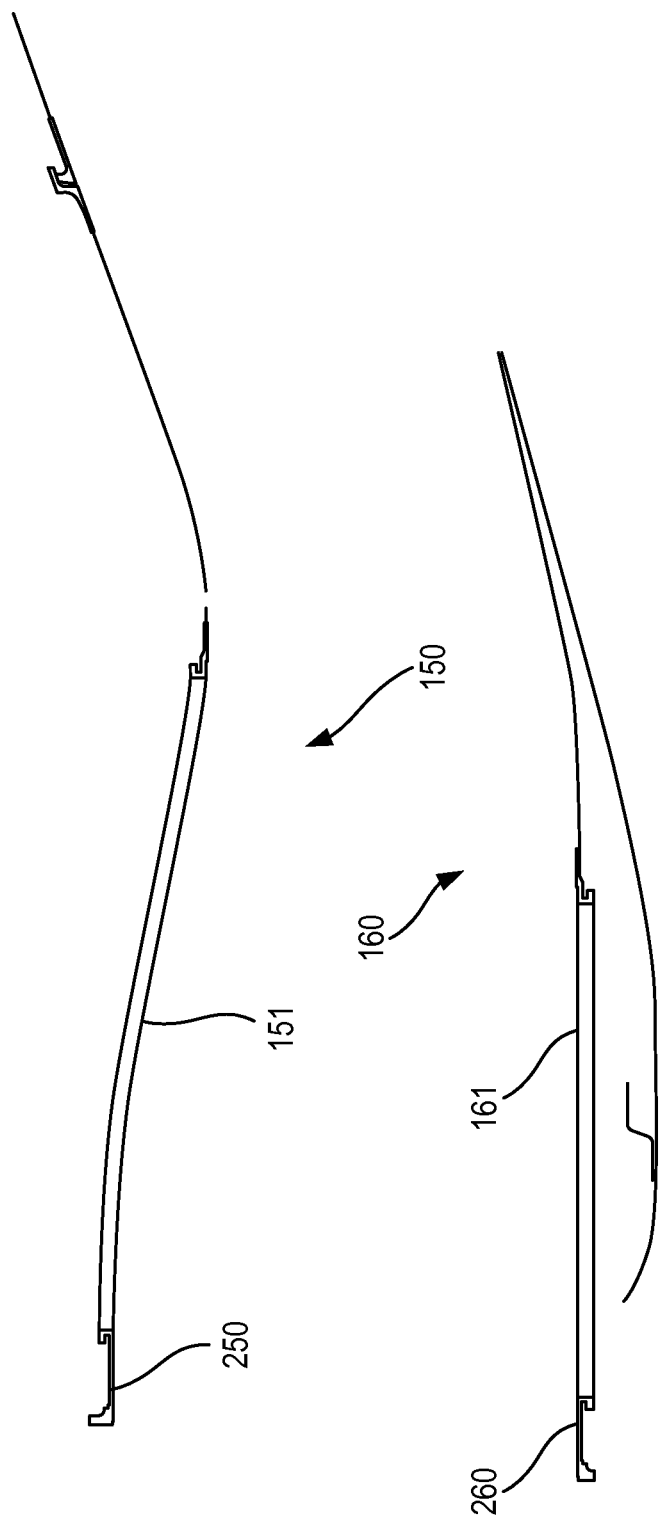
FIG. 2 illustrates a cross-section view of an exhaust nozzle and center body in accordance with various embodiments.

Referring to FIG. 2, a cross-section of a portion of the exhaust nozzle 160 and the exhaust nozzle center body 150 is illustrated according to various embodiments. The exhaust nozzle 160 may comprise a structural panel 161 having a core sandwiched between a top skin and a bottom skin, and the exhaust nozzle center body 150 may comprise a structural panel 151 having a core sandwiched between a top skin and a bottom skin. The exhaust nozzle 160 may be coupled to the engine by an exhaust nozzle attach ring 260. The exhaust nozzle center body 150 may be coupled to the engine by a center body attach ring 250.

Figure 3:
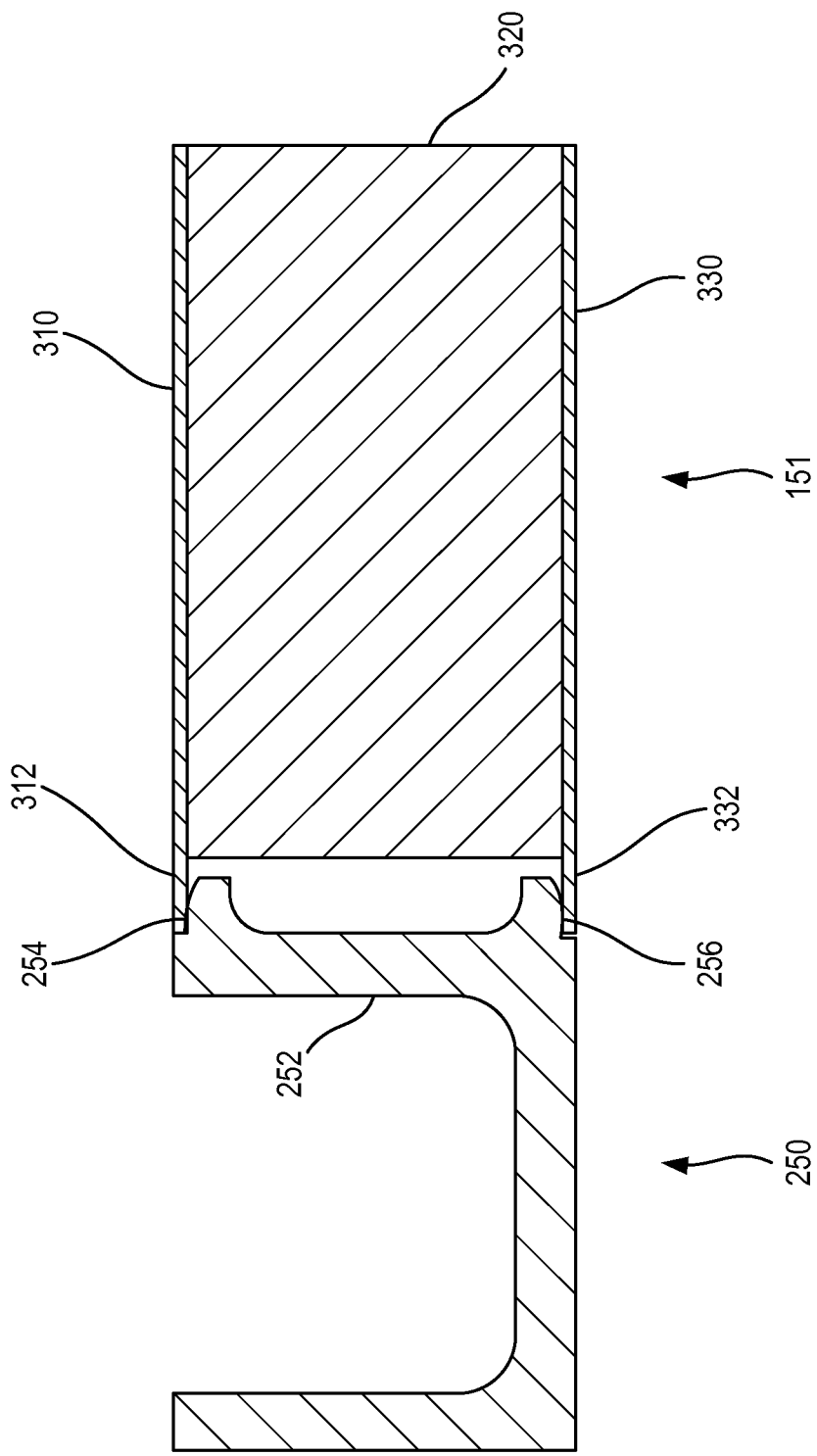
FIG. 3 illustrates an enlarged cross-section view of a structural panel and a center body attach ring in accordance with various embodiments.

Referring to FIG. 3, an enlarged cross-section view of the structural panel 151 and the center body attach ring 250 is illustrated according to various embodiments. The structural panel 151 may comprise a top skin 310, a core 320, and a back skin 330. The core 320 may be sandwiched between the top skin 310 and the back skin 330. In various embodiments, the top skin 310 and the back skin 330 may be bonded or welded to the core 320. The core 320 may comprise a plurality of cells, such as honeycomb cells.

The top skin 310 may comprise a cantilevered portion 312 which extends beyond an edge 322 of the core 320. Similarly, the back skin 330 may comprise a cantilevered portion 332 which extends beyond the edge 322 of the core 320.

The center body attach ring 250 may comprise a bracket arm 252 with a first flange 254 cantilevered from the bracket arm 252, and a second flange 256 cantilevered from the bracket arm 252. The cantilevered portion 312 of the top skin 310 may be coupled to the first flange 254. The cantilevered portion 332 of the back skin 330 may be coupled to the second flange 256.

Figure 4:
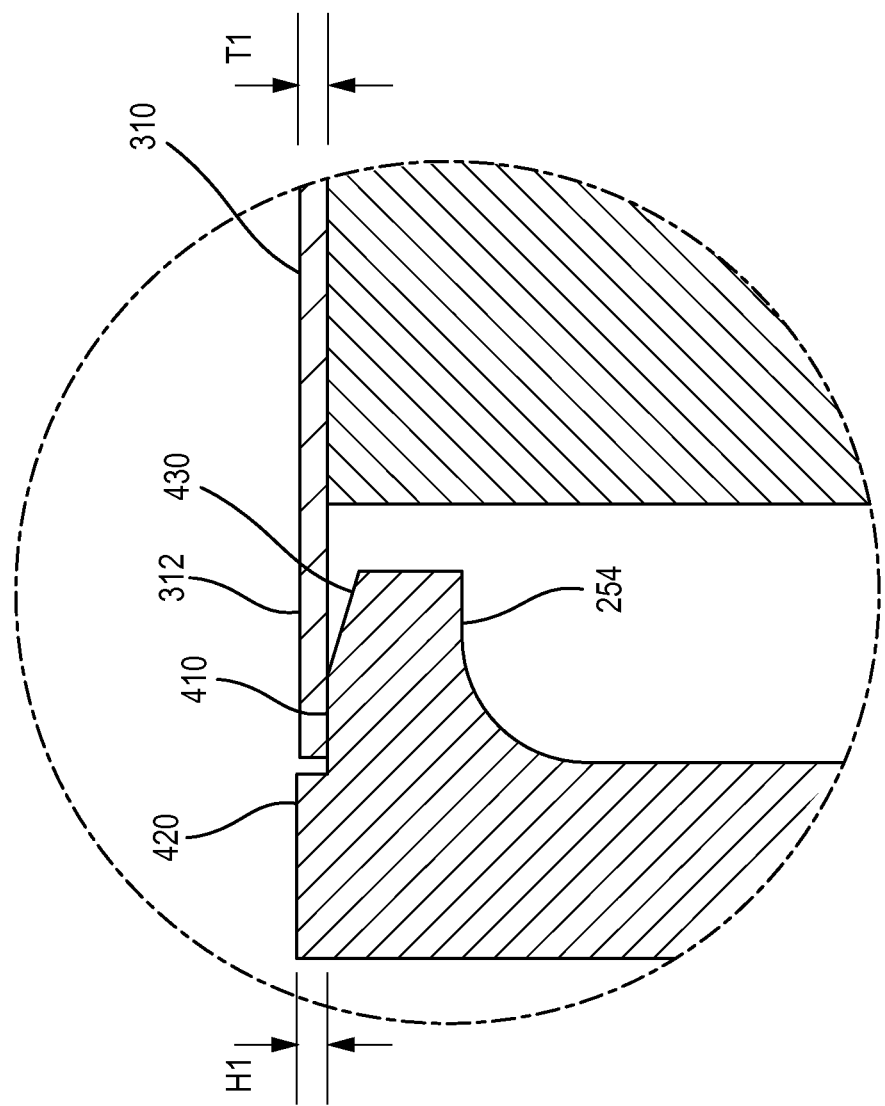
FIG. 4 illustrates an enlarged cross-section view of a first flange and a top skin in accordance with various embodiments.

Referring to FIG. 4, an enlarged cross-section view of the first flange 254 and the top skin 310 are illustrated according to various embodiments. The first flange 254 may comprise a land 410. The land 410 may be parallel to a top surface 420 of the bracket arm 252. The land 410 may be offset from the top surface 420 of the bracket arm 252 by a height H1 to accommodate for the thickness T1 of the top skin 310, such that the top surface 420 and the top skin 310 form a flush or substantially flush surface. In various embodiments, the height H1 may be equal to the thickness T1 within a manufacturing tolerance, such as within 10%.

The first flange 254 may comprise a lead ramp 430. The lead ramp 430 may be adjacent to the land 410. The lead ramp 430 may form an angle with the land 410. In various embodiments, the angle may be 15°. In various embodiments, the angle may be between 10°-20°. The structural panel 151 may be pressed against the attach ring to couple the structural panel 151 to the attach ring. As the structural panel 151 is pressed against the attach ring, the cantilevered portion 312 of the top skin 310 may contact the lead ramp 430. As the structural panel 151 continues to be pressed against the attach ring, the lead ramp 430 may guide the cantilevered portion 312 of the top skin 310 onto the land 410. The cantilevered portion 312 may bend slightly to accommodate for any tolerance mismatches. The cantilevered portion 312 may be welded or bonded to the land 410.

Figure 5:
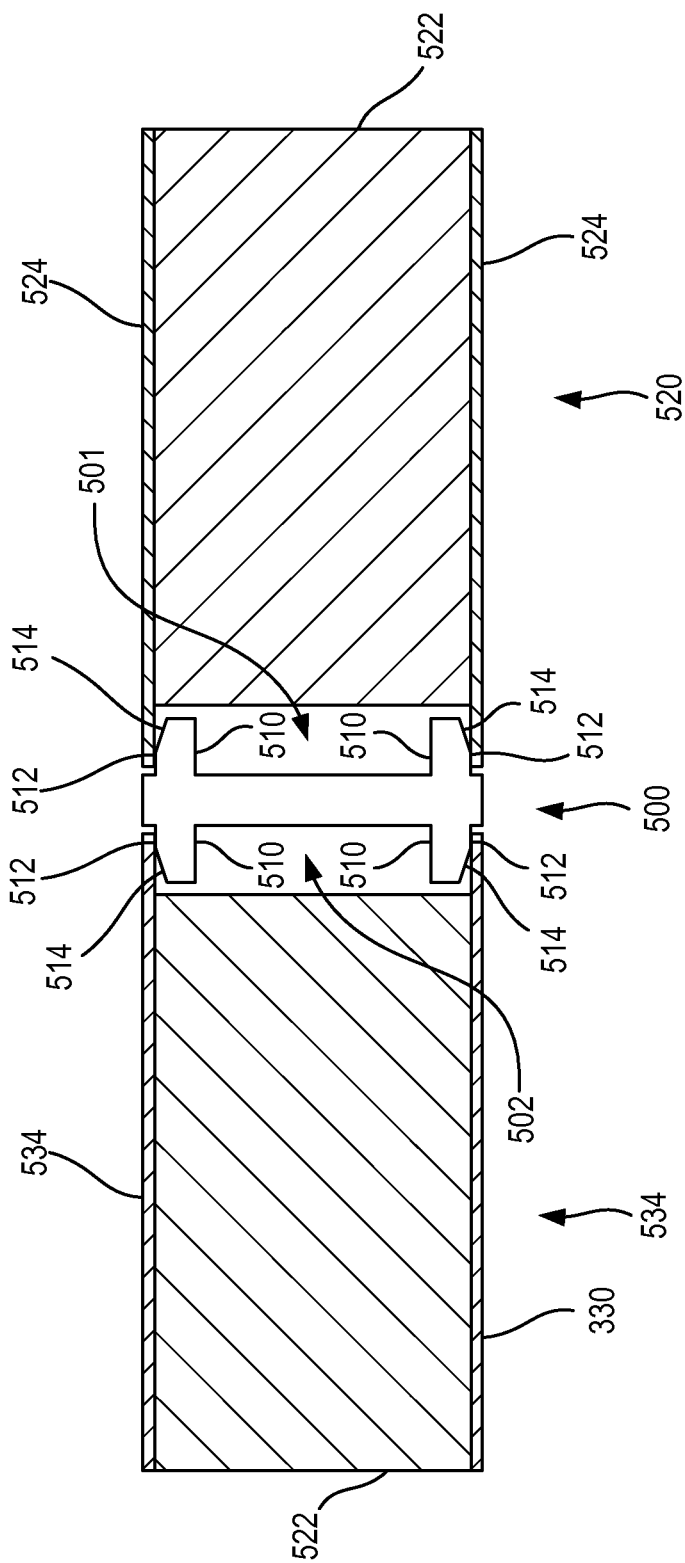
FIG. 5 illustrates a dual-sided attachment feature in accordance with various embodiments.

Referring to FIG. 5, a cross-section view of a dual-sided attachment feature 500 is illustrated according to various embodiments. The dual-sided attachment feature 500 may be used to couple adjacent structural panels together. The dual-sided attachment feature 500 may comprise four flanges 510. Each flange 510 may comprise a land 512 and a lead ramp 514. A first structural panel 520 may be coupled to a first side 501 of the dual-sided attachment feature 500, and a second structural panel 530 may be coupled to a second side 502 of the dual-sided attachment feature 500. The first structural panel 520 may comprise a core 522 and two skins 524. The second structural panel 530 may comprise a core 532 and two skins 534. Each structural panel 520, 530 may be pressed against the dual-sided attachment feature 500. The skins 524 on the first structural panel 520 may contact the lead ramps 514 on the first side 501 of the dual-sided attachment feature 500. The skins 534 on the second structural panel 530 may contact the lead ramps 514 on the second side 502 of the dual-sided attachment feature 500. The lead ramps 514 may align the structural panels 520, 530 and guide the skins 524, 534 onto the lands 512. The contact between the lead ramps 514 and the skins 524, 534 may cause the skins to bend slightly. The bending of the skins may allow for both skins of a structural panel to be aligned with the skins of an adjacent structural panel if the manufacturing tolerances of the structural panels are greater than the allowable tolerances when adjoining adjacent structural panels.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

I claim:

1. An attachment feature for a structural panel comprising:
  a bracket arm;
  a first flange extending from the bracket arm, wherein the first flange comprises a first land and a first lead ramp adjacent to the first land; and
  a top surface, wherein a height from the first land to the top surface is equal to a thickness of a top skin of a structural panel configured to be coupled to the attachment feature such that the top surface is flush with the top skin of the structural panel when the structural panel is coupled to the attachment feature,
  wherein the first land separates the top surface from the lead ramp,
  wherein the attachment feature is a single component and is configured to couple at least one of an exhaust nozzle or an exhaust nozzle center body to a gas turbine engine.

2. The attachment feature of claim 1, wherein the attachment feature is an annular ring.

3. The attachment feature of claim 1, further comprising a second flange extending from the bracket arm.

4. The attachment feature of claim 3, wherein the second flange comprises a second land and a second lead ramp adjacent to the second land.

5. The attachment feature of claim 1, wherein the first land is parallel to the top surface of the bracket arm.

6. The attachment feature of claim 1, wherein the first land and the first lead ramp form an angle of between 10° and 20°.

7. The attachment feature of claim 1, wherein the first flange is located on a first side of the bracket arm, and wherein a second flange is located on a second side of the bracket arm.

8. A nacelle comprising:
  a structural panel comprising a top skin, a back skin, and a core located between the top skin and the back skin; and
  an attachment feature coupled to the structural panel, wherein the attachment feature comprises a lead ramp, a land, and a top surface, the land situated between the lead ramp and the top surface,
  wherein the top skin is flush with the top surface of the attachment feature,
  wherein a height from the land to the top surface is equal to a thickness of the top skin, and
  wherein the attachment feature is a single component and is configured to couple at least one of an exhaust nozzle or an exhaust nozzle center body to a gas turbine engine.

9. The nacelle of claim 8, wherein the top skin comprises a cantilevered portion coupled to the land.

10. The nacelle of claim 9, wherein the cantilevered portion is at least one of welded or bonded to the land.

11. The nacelle of claim 8, wherein the structural panel is a portion of the exhaust nozzle center body.

12. The nacelle of claim 11, wherein the attachment feature is a center body attach ring.

13. The nacelle of claim 8, wherein the land and the lead ramp form an angle of between 10° and 20°.

* * * * *